United States Patent
Busch et al.

[15] 3,648,283
[45] Mar. 7, 1972

[54] APPARATUS FOR DISPLAYING BEARING MARKERS ON A RADAR SCREEN

[72] Inventors: Carl Wilhelm Busch; Kurt Scheer, both of Bremen, Germany

[73] Assignee: Fried Krupp Gesellschaft mit beschrankter Haftung, Essen, Germany

[22] Filed: July 11, 1969

[21] Appl. No.: 840,941

[30] Foreign Application Priority Data

July 12, 1968 Germany.......................P 17 73 831.7

[52] U.S. Cl....................343/5 EM, 343/5 ST, 343/112 CA
[51] Int. Cl..........................................................G01s 7/12
[58] Field of Search......................343/5 EI, 5 ST, 112.4

[56] References Cited

UNITED STATES PATENTS

| | | | |
|---|---|---|---|
| 3,113,211 | 12/1963 | Thews | 343/112.4 UX |
| 3,123,824 | 3/1964 | Sherertz | 343/5 EI X |
| 3,149,325 | 9/1964 | Kellogg | 343/112.4 X |
| 3,267,470 | 8/1966 | Riggs | 343/112.4 UX |
| 3,328,793 | 6/1967 | McLaughlin et al. | 343/5 EI |
| 3,383,677 | 5/1968 | Baum et al. | 343/5 ST |

FOREIGN PATENTS OR APPLICATIONS

1,086,487  10/1967  Great Britain.......................343/5 EI

*Primary Examiner*—T. H. Tubbesing
*Attorney*—Spencer & Kaye

[57] ABSTRACT

Apparatus for use with a position-finding system that operates according to the reflected beam principle. This position-finding system, e.g., a radar system, has a revolving beam-receiving antenna as well as a cathode-ray display tube with a deflection system arranged to rotate in synchronism with the antenna. The apparatus according to the present invention is intended to provide a display of one or more radially extending traces on the screen of the cathode-ray tube at selectable angular positions thereof to provide reference bearing information to the operator of the system. The apparatus includes a memory device, connected to rotate in synchronism with the antenna, for storing signals at preselected angular positions on its surface. The apparatus further includes means to write signals into or erase signals from the memory device and means to repeatedly read out these signals from the memory device during each revolution thereof to display a bearing trace on the cathode-ray tube screen in response to each signal when read.

10 Claims, 3 Drawing Figures

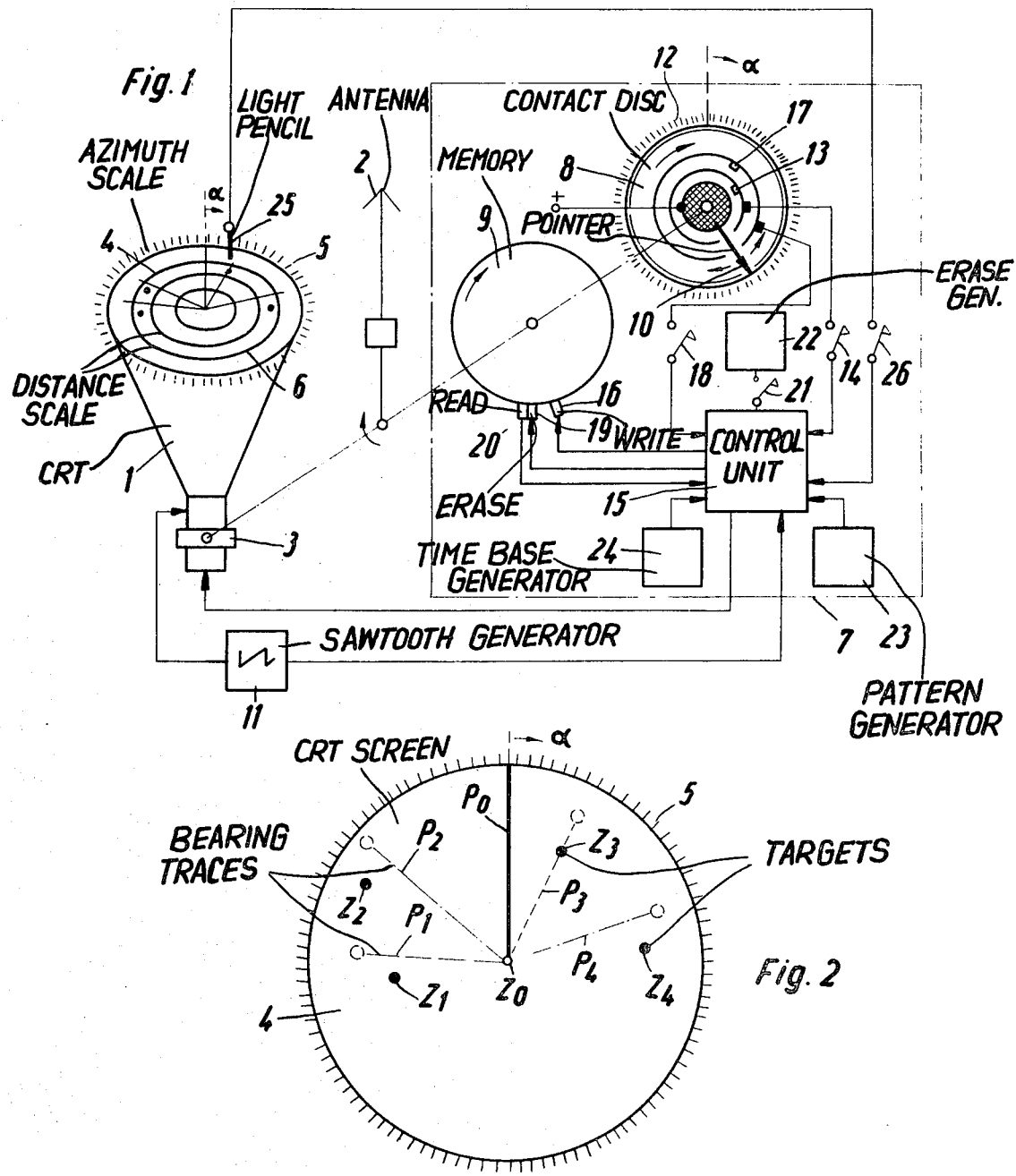

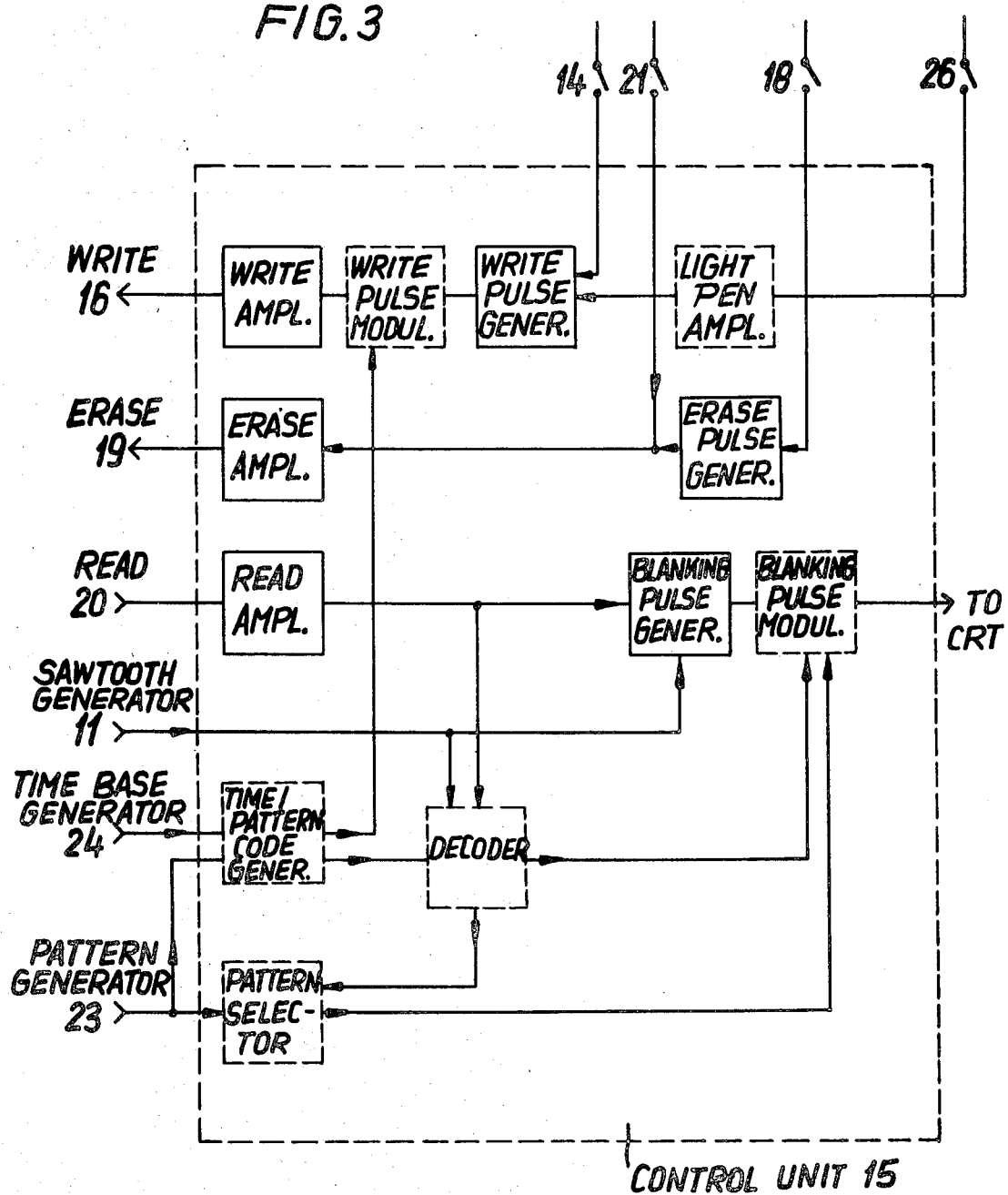

APPARATUS FOR DISPLAYING BEARING MARKERS ON A RADAR SCREEN

BACKGROUND OF THE INVENTION

The present invention relates to an apparatus for use with a position-finding system of the type using a reflected beam, which is capable of displaying reference bearing information on the system's display device. More particularly, the present invention relates to a bearing trace generator for simultaneously producing any desired number of different traces on the screen of a cathode-ray tube employed to provide a panoramic display in a radar system.

One of the most important functions of present day radar systems is to prevent collisions of ships at sea. In order to determine when a ship is in danger of collision, it is necessary to continuously observe those radar beam-reflecting objects on the screen of the shipboard radar system for which there is a possibility of collision. In general, it is important to determine the relative motion of these objects or radar targets with respect to the observing, radar-carrying vessel. It is particularly important to watch for a change in the bearing of the target since the maintenance of a constant azimuth (or so-called "constant bearing line") is the clearest indicia of a collision course.

These kinds of observation with shipboard radar systems are usually carried out by periodically writing down the positions of any objects with which a collision is possible. Another technique has been to manually mark the positions of objects on a transparent writing surface placed over the radar screen; subsequently removing these marks either by erasure or by changing the writing surface.

Especially when the ship which carries the radar system must move in heavily travelled waterways or canals, these prior art techniques are extremely inconvenient and inexact.

The British Pat. No. 1,086,487 to Eric Parker discloses a device for assisting an operator in interpreting a radar screen to prevent collisions at sea. This device functions to produce and maintain an electronically generated bearing trace or marker on the screen of the cathode-ray tube. The device is constructed to periodically release the bearing trace, for display at a manually preselected point on the screen, during the interscan periods between the radar display scans.

Although this device provides a considerable improvement in convenience and accuracy, if it is desired to simultaneously monitor the position of several objects relative to the radar-carrying ship with the aid of a separate bearing trace associated with each object, it is necessary to provide one such marker generating device for each of the bearing traces. For large numbers of traces there is accordingly a requirement for a large amount of expensive equipment.

SUMMARY OF THE INVENTION

An object of the present invention, therefore, is to provide apparatus which is capable of producing and maintaining any desired number of bearing traces on the cathode-ray tube screen of a radar system.

It is a further object of the present invention to provide apparatus of the above-described type which is convenient to operate and permits individual bearing traces to be selectively written on to and removed from the cathode-ray tube screen.

It is also an object of the present invention to provide apparatus of the above-described type which can be realized with a minimum of expense.

These objects, as well as other objects which will become apparent in the discussion that follows, are achieved, according to the present invention, by providing a bearing trace generator having a storage unit connected to rotate in synchronism with the antenna and the cathode-ray tube deflection system of the particular radar device with which it is associated. This storage unit or memory will thus be capable of storing any desired number of marks or signals around its circumference so that a bearing trace, associated with each mark, can be displayed on the cathode-ray tube screen.

The rotating storage unit is provided with suitable readout means so that each bearing-indicating mark will be repeatedly read out upon each revolution. As each mark is read out, it causes the display of a bearing trace upon the screen of the cathode-ray tube. Means can also be provided, if necessary, to identify each individual bearing trace by modulating its intensity.

The bearing trace generator according to the present invention is also provided with a manually operable device for writing marks into and erasing them from the rotating storage unit. One preferred embodiment of this device includes a contact disc, connected to rotate in synchronism with the storage unit, and an adjustable pointer, which can be manually rotated to any angular position about the axis of the contact disc. Upon each rotation of the antenna, the contact disc will release a pulse at the instant that the antenna is in the angular position selected by the adjustable pointer. By pressing a suitable "write" or "erase" button, the operator of the system can transfer this bearing information into or out of the storage unit, respectively.

It is possible to simplify the operation of the system if the device just described for transferring the bearing information into and out of the storage unit is replaced by a conventional light pencil, having a light-sensitive tip. When manually placed against the screen of the cathode-ray tube, at the point displaying a target, such a light pencil will emit a pulse each time the rotating trace on the screen sweeps by the particular angle at which it is placed. By pressing a suitable "write" or "erase" button, the operator can either write into or erase this bearing information from the storage unit.

According to a preferred embodiment of the present invention, the storage unit is constructed as a rotating drum or disc which carries a magnetizable layer. Suitable magnetic heads are also provided, as is conventional in the art, to write, read and erase information from the magnetizable layer.

If the motion of a large number of objects is to be observed on the radar screen, it is useful if different ones of the bearing traces are distinguished by certain identifying characteristics. Such identifying marks would aid both in the detailed evaluation and in the quick review of the traces on the radar screen. According to a preferred embodiment of the present invention, therefore, the bearing traces associated with the individual targets are distinguished by lines comprised of different combinations of dots and dashes.

In addition, it is useful if the bearing traces are not extended outward from the center of the screen of the cathode-ray tube to the outer edge thereof, but are extended only a distance corresponding to the distance of the associated target. A change in the distance between the radar-carrying vessel and the observed object will then be extremely easy to interpret since the instantaneous position of an object can be compared with its earlier position at the end of its associated bearing trace.

It is also possible, according to the present invention, to vary the intensity of the bearing trace in dependence upon the length of time in which it has been displayed on the screen. For example, bearing traces which have remained on the screen for a prescribed length of time can be made increasingly fainter or can be made to progressively disappear radially outward from the center of the screen.

BRIEF DESCRIPTION OF THE DRAWINGS

FIG. 1 is a schematic illustration of the apparatus according to the present invention for displaying bearing traces on the screen of a cathode-ray tube.

FIG. 2 is a view of the panoramic display screen of the cathode-ray tube of FIG. 1 showing exemplary bearing traces produced by the apparatus according to the present invention.

FIG. 3 is a block diagram of the control unit employed in the apparatus of FIG. 1.

DESCRIPTION OF THE PREFERRED EMBODIMENT

The preferred embodiment of the present invention will now be described with reference to the various figures of the drawings. FIG. 1 thereof shows a portion of a radar system comprising a cathode-ray tube 1 and a rotating antenna 2. The cathode beam of the cathode-ray tube 1 is subjected to a radial deflection in the manner conventional in the art by a deflection system 3 which rotates about the tube axis in synchronism with the rotation of the antenna 2. The angular position of the deflection system consequently indicates the instantaneous bearing direction being viewed by the radar system. During every revolution of the deflection system, the cathode beam is subjected to multiple radial deflections by a sawtooth generator 11 so that the beam's instantaneous radial position reflects the distance of objects or targets which thus appear as bright spots in panoramic display on the cathode-ray tube screen 4. The direction of each target can therefore be obtained by reference to an azimuth scale 5 surrounding the screen while the distance thereof can be observed with the aid of concentric circles 6 which form a distance scale. As is conventional in the art, these directions and distances are viewed with respect to the position of the radar antenna 2 (or, more generally, to the radar-carrying vessel) which is represented as the center point on the screen 4.

The apparatus 7, according to the present invention, is provided to selectively mark the bearings of particular displayed targets by means of traces on the screen 4. This apparatus 7 is capable of producing and maintaining any desired number of bearing traces on the cathode-ray tube screen and also of clearing (i.e., removing) selected ones of these traces on command. The apparatus consists chiefly of (1) a manually operated marking device having an adjustable pointer 10 rotatable about the entire angular range and a contact plate 8 connected to rotate in synchronism with the antenna 2, and (2) a storage unit or memory 9 which is likewise connected to rotate in synchronism with the antenna 2.

To best illustrate the operation of the apparatus 7, the embodiment thereof shown in FIG. 1 is provided both with one write contact 13 and one erase contact 17 on the contact disc 8. If one of the operating pushbuttons is actuated—either the write key 14 or the erase key 18—a potential (indicated by the "z") placed upon the adjustable pointer will be passed to a central control unit 15 in the form of a pulse as the rotation of the disc causes the write contact 13 or erase contact 17, respectively, to come in contact with the pointer 10. When a respective write or erase pulse is transmitted to the control unit 15, the latter produces the appropriate signals to cause a bearing trace to be written onto—or, in the case of erase, to be removed—from the screen 4 of the cathode-ray tube 1. This written or removed bearing trace will consequently lie in the direction indicated by the particular position of the manually adjustable pointer 10. The control unit will also simultaneously cause a corresponding bearing-indicating mark to be written onto or erased from the rotating memory 9.

The memory or storage unit 9 employed in the illustrated embodiment is preferably a disc or drum which carries a layer of magnetizable material (e.g., a so-called "magnetic drum"). This storage unit is equipped with the usual magnetic head devices for writing, reading and erasing the information. These devices are schematically illustrated as the write head 16, erase head 19 and the read head 20.

With each rotation of the antenna 2, and with it the memory 9, the bearing-indicating marks are read out of the memory by the read head 20 and passed to the central control unit 15. This control unit then releases a brightness control pulse to the cathode-ray tube 1 which is matched to the length of the period of radial deflection of the tube determined by the sawtooth generator 11. As a result, a bearing trace P is caused to be written on the screen 4 of the tube 1 from the center of the screen to its outer edge.

Instead of requiring the selective erase of each particular bearing trace by manipulation of the adjustable pointer 10 and actuation of the erase key 18, it is also possible to erase the entire contents of the memory 9 at once by holding closed an erase key 21 to connect the control unit to an erase generator 22. The erase generator delivers the erase current (via an erase amplifier within the control unit 15) to the erase head. This erase current may be of radio frequency as conventional with tape recording devices or for an inexpensive version a DC current of suitable value and polarity.

The memory 9 which controls the periodic release of the brightness pulses to produce the bearing traces P is subject to various modifications and changes which are known in the art. It is possible, for example, to employ electrostatic techniques to store the information, or to utilize time delay or digital memories in place of the magnetic drum or disc illustrated in FIG. 1.

The accuracy in the writing and erasing of direction-indicating markings can be improved by the employment of coincidence gates.

The central control unit 15 can be provided with circuits, such as the pattern generator 23, to identify individual ones of the bearing traces. This identification can be effected, for example, by modulating the brightness of each bearing trace to produce a line formed of a combination of dots and dashes.

The control unit 15 can be also provided with a time base 24 which serves to superimpose temporal information on the display of the bearing traces. For example, this time base 24 can operate in conjunction with the control unit 15 to cause an initially solid-lined bearing trace to be formed by increasingly shorter dashed lines or to progressively disappear from its point of origin (the center of the screen) outward.

To simplify the observation of the change of distance between a particularly interesting target and the viewing vessel, means can be provided to cause the bearing trace to be extended outward on the screen 4 only as far as the object Z (i.e., so as not to pass through the object and extend to the edge of the screen). AS the object moves away from the end of such a distance-indicating bearing trace, the change in the distance between the observing vessel which carries the radar system and the observed object Z will be easy to interpret.

FIG. 2 provides an example of a relative display as may be produced on the screen 4 of the cathode-ray tube 1 with the apparatus 7 according to the invention. As a rule, it will be the forward lying objects $Z_i$ (the objects ahead of the radar-carrying vessel) which will be of interest and which will be marked by corresponding bearing traces $P_i$. An additional trace, $P_0$, displays the forward direction of the radar-carrying vessel $Z_0$.

The bearing traces on the screen shown in FIG. 2 are produced with different patterns for purposes of identification. In addition, the bearing traces $P_i$ are extended outward from the center of the screen only a distance corresponding to the distance of their respective observed targets $Z_i$; not to the edge of the screen.

At the time that the bearing traces $P_i$ were written, their respective targets $Z_i$ lay at the points at the end of the traces, indicated in dashed lines. After the expiration of a certain time, the targets will have moved to new positions relative to the observing vessel such as those designated by the solid dots. Upon comparison of the new positions with the old, it may be seen that the objects $Z_1$, $Z_2$ and $Z_4$ present no danger of collision to the observing vessel even though they exhibit a component of motion in the direction of the vessel. In addition, as may be seen from the shortened bearing trace $P_4$, this bearing trace has been present for a relatively long time and is consequently becoming of diminishing interest. Since the objects $Z_1$ and $Z_4$ already lie at positions abeam of the observing vessel, their associated bearing traces $P_1$ and $P_4$ may be selectively erased in order to free the panoramic display of superfluous marks.

On the other hand, the object $Z_3$ lies at the condition of "constant bearing line" at a continuously reducing distance. Its associated bearing trace $P_3$ should therefore continue to remain under observation so that, if necessary, the course of the radar-carrying vessel can be changed to avoid a collision.

FIG. 3 is a block diagram of the control unit employed in the apparatus of FIG. 1.

When a respective write or erase pulse is transmitted to the control unit the write pulse generator or the erase pulse generator produces a pulse of sufficient length which is fed to the magnetic head devices. A stored pulse is picked up by the reading head device, amplified and passed to the blanking pulse generator which delivers a suitable voltage to the cathode-ray tube to brighten the trace.

For use with the time base generator or the pattern generator a modulator for the writing pulse and a modulator for the blanking pulse is added. With the help of the write pulse modulator an identification signal can be stored with each pulse.

This identification signal is detected by the decoder. The decoder gives an appropriate signal to the blanking pulse modulator or activates the pattern selector to transmit the selected pattern to the blanking pulse modulator.

The identification signal may be chosen at will by the operator or automatically.

The automatically set identification signal may for example include, in binary coded form, the time at the original recording of the pulse. The decoder compares this signal with the time at reading the pulse and developes a modulation signal for the blanking pulse modulator as to give the operator an indication of the elapsed time between the original recording of the pulse and current representation of the trace. The necessary timing signals are generated by the time base generator 24.

To terminate the bearing trace at the point of display of an object, the length of the trace is limited by a suitable pattern chosen either by the operator with the help of the pattern generator or by an automatic distance measuring device as is conventional in the art. This pattern can be stored with the pulse.

The apparatus according to the present invention is not limited to the above-described embodiment. For example, the apparatus of FIG. 1 can be provided with a manually operated light pencil 25 with a light-sensitive tip. The pencil is held directly against the cathode-ray tube screen 4 at the point of light representing the object Z to which a bearing trace P is to be placed. Depending upon the construction of the central control unit 15, the illumination of the luminous dot representing the object Z may alone cause a bearing-indicating marking to be written into the memory 9. If desired, however, an additional write switch or key 26 may be provided for actuation by hand.

If the magnetic layer type storage is employed for the memory 9, the separate read and write heads 16 and 20 which are shown in FIG. 1 can be combined, in the manner known in the art, into a single read-write head since it is never necessary to simultaneously read and write a bearing-indicating marking. Likewise, in place of the separate write and erase contacts 13 and 17, respectively, it is possible to employ a common contact since only one or the other of the write or erase keys 14 and 18, respectively, will be actuated.

In order to make do with a low number of different dot-dash combinations for the identification of different adjacent bearing traces, it is practical to divide the screen 4 of the cathode-ray tube 1 into various sectors and to repeat these combinations in each sector. It is only necessary to ensure that two adjacent bearing traces in adjacent sector do not bear the same identification.

In addition to its use in radar systems with a relative panoramic display, the apparatus according to the present invention is also advantageous when used in conjunction with the method of "course radar display" or the "true motion method."

It will be understood that the above description of the present invention is susceptible to various modifications, changes and adaptations.

What is claimed is:

1. Apparatus for use with a reflected beam position-finding system which has a revolving beam-receiving antenna and a cathode-ray tube for display of beam-reflecting objects, said tube having a deflection system arranged to rotate in synchronism with said antenna, said apparatus comprising, in combination:

a. memory means, connected to rotate in synchronism with said antenna, for storing signals at preselected angular positions of said antenna and said deflection system of said cathode-ray tube;
   b. means connected to said memory means for writing signals into said memory means at preselected angular positions of said memory means and for selectively erasing signals from said memory means; and
   c. means, connected to said memory means and to said cathode-ray tube, for repeatedly reading said signals from said memory means during each rotation of said memory means and for causing said cathode-ray tube to display a bearing trace in response to each signal when read;

whereby said apparatus is operative to provide a display of one or more bearing traces on the screen of said cathode-ray tube at selectable angular positions around said screen.

2. The apparatus defined in claim 1, wherein said position-finding system is a radar system suitable for use on a movable vehicle.

3. The apparatus defined in claim 1, wherein said cathode-ray tube is connected to provide a panoramic display of beam-reflecting objects.

4. The apparatus defined in claim 1, wherein said writing and erasing means includes:

1. contact disc means, connected to rotate in synchronism with said memory means, and having at least one electrical contact;
   2. adjustable pointer means, arranged coaxially with said contact disc means, to come in contact with said at least one electrical contact during each revolution of said contact disc means, said pointer means being manually rotatable about its axis to selected angular positions;
   3. means connecting said adjustable pointer means to a source of electrical potential; and
   4. means connecting said at least one contact to said memory means.

5. The apparatus defined in claim 4, wherein said contact disc means has one contact for writing signals into said memory means and one contact for erasing signals from said memory means.

6. The apparatus defined in claim 4, wherein said memory means includes:

1. carrier means, connected to rotate in synchronism with said antenna, having a magnetizable layer arranged thereon; and
   2. magnetic head means for writing, reading and erasing signals on said magnetizable layer.

7. The apparatus defined in claim 1, further comprising means, connected to said reading and displaying means, for varying the intensity of different ones of the bearing traces in a different manner, thereby to provide said bearing traces with an identifying characteristic.

8. The apparatus defined in claim 1, further comprising means, connected to said reading and displaying means, for varying the intensity of each of the bearing traces in dependence upon the distance of a reflecting object associated with each bearing trace.

9. The apparatus defined in claim 1, further comprising means, connected to said reading and displaying means, for varying the intensity of each of the bearing traces in dependence upon the length of time in which each bearing trace has been displayed.

10. The apparatus defined in claim 1, wherein said writing and erasing means includes:

1. light pencil means, arranged to be manually placed against the screen of said cathode-ray tube, having a light-sensitive tip; and 2. means, connecting said light pencil means to said memory means, for writing a signal into said memory means in response to a signal from said light pencil means.

* * * * *